Aug. 30, 1949.  V. A. DOLASER  2,480,399
CENTER PUNCH
Filed Jan. 13, 1948
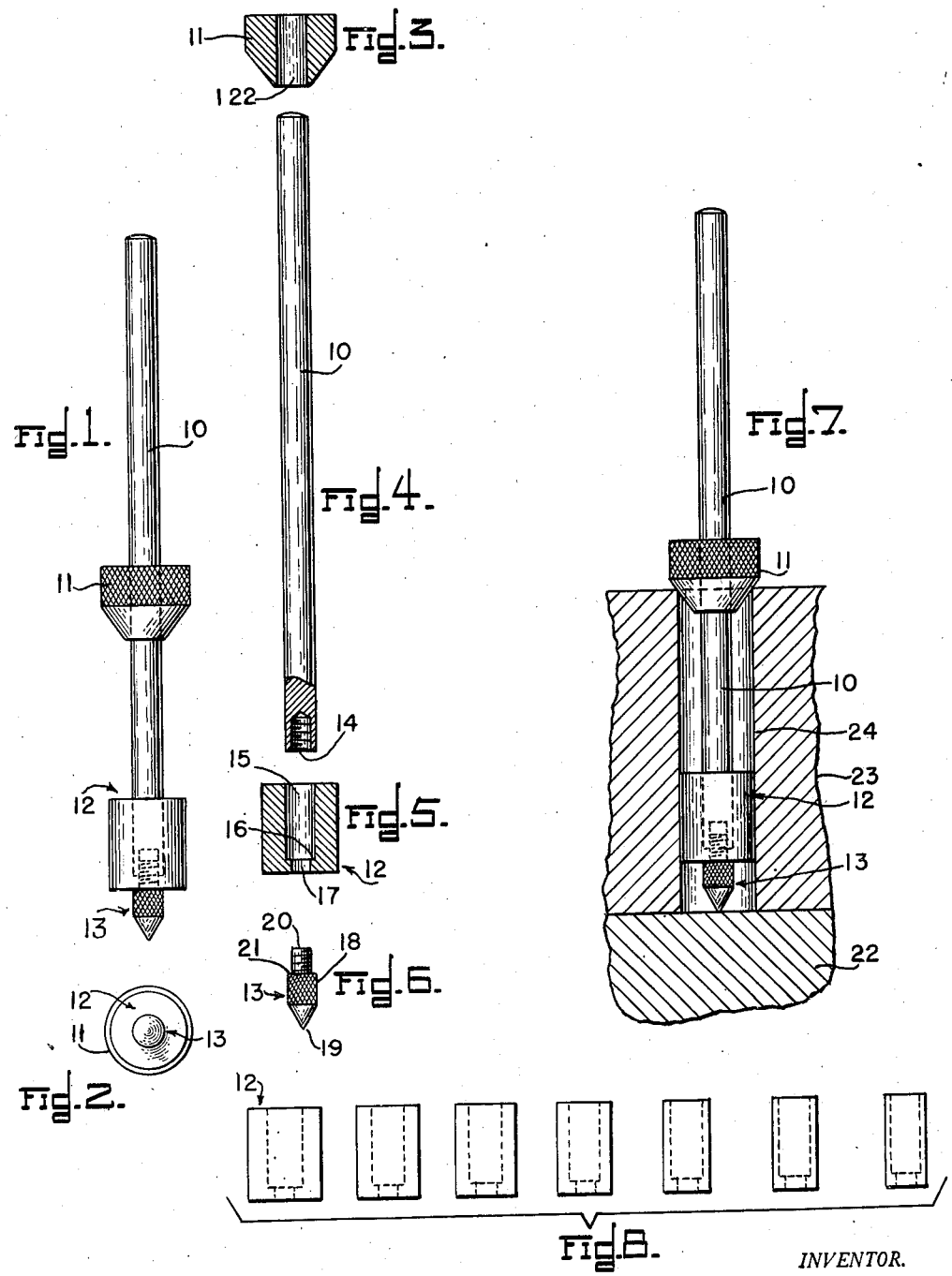
INVENTOR.
VINCENT A. DOLASER.
BY
Arthur F. Randall
Atty.

Patented Aug. 30, 1949

2,480,399

UNITED STATES PATENT OFFICE 2,480,399

CENTER PUNCH

Vincent A. Dolaser, Saugus, Mass.

Application January 13, 1948, Serial No. 2,112

2 Claims. (Cl. 33—191)

This invention relates to improvements in center marking devices and it has for its object to provide an improved device of the class indicated which will be of simple and efficient construction and preferably capable of ready modification to adapt it to work of different kinds.

A further object of the invention is to provide an improved center punch of that type which is employed within a bolt hole or other cavity of one piece of work, or of a template, to mark the center of said hole or aperture upon a second piece of work while said first-mentioned piece of work occupies a position upon said second piece.

To these ends I have provided a center punch for spotting a center at the bottom of a cylindrical cavity, said device comprising a straight spindle whereof one end is telescopically fitted into, and seated within, a longitudinal axial socket provided in a centering bushing where it is held securely by means of a removable prickpoint member that is separably connected with the inner end of said spindle. The invention also contemplates the provision of a fourth element consisting of a conical sleeve slidably mounted upon the spindle for use when operating within deep cavities, said conical sleeve being fitted into the mouth of the cavity to center the outer end portion of the spindle while the bushing centers the inner end portion and the prick-point, but this conical sleeve is not required when operating within shallow cavities.

Other features of the invention are hereinafter pointed out.

In the accompanying drawings:

Figure 1 is a side elevation of my improved center punch.

Figure 2 is an elevation of the lower end of the punch shown in Fig. 1.

Figure 3 is a central longitudinal sectional view of the conical centering sleeve element hereinafter described.

Figure 4 is a side elevation, partly in section, of the spindle element hereinafter described.

Figure 5 is a central longitudinal sectional view of the centering bushing element hereinafter described.

Figure 6 is a side elevation of the prick-point element hereinafter described.

Figure 7 illustrates the manner in which the device of Figure 1 is employed to spot a center at the bottom of a deep cavity.

Figure 8 shows a set of centering bushings of different sizes suitable for use within bolt holes of different standard sizes.

The illustrated embodiment of this invention comprises a straight elongate exteriorly cylindrical metallic spindle 10, Fig. 4, which may measure, for example, one-quarter inch in diameter and six inches in length; a conical metallic sleeve element 11, Fig. 3; an exteriorly cylindrical metallic centering bushing 12, Fig. 5, and a hardened steel prick-point element 13, Fig. 6.

At its one end the spindle 10 is made with an axially disposed threaded socket 14; the centering bushing 12 is made with an axially disposed cylindrical socket 15 provided at its bottom with a radial annular shoulder or seat 16 surrounding a centrally disposed aperture 17; the spotting element 13 comprises an exteriorly knurled cylindrical body 18 provided at its one end with a conical point 19 and at its opposite end with a threaded extension of smaller diameter than the body 18 so as to provide this element with an annular radial shoulder 21, while the conical sleeve element 11 is made with a central longitudinal cylindrical hole 122 therethrough so that it can be slidably fitted in position upon the spindle 10.

The lower end of the spindle 10 is slidably fitted into the socket 15 of bushing 12 with the inner or lower end seated upon the shoulder 16 of the bushing after which the threaded extension 20 of spotting element 13 is passed through aperture 17 and screwed into the threaded socket 14 of spindle 10 with its shoulder 21 bearing tightly against the bottom end of bushing 12. When the device is to be used within a cavity whose depth is substantially greater than the distance between the top of bushing 12 and the tip of the prick point 19 the conical sleeve 11 is applied to the spindle 10 as shown in Figs. 1 and 7 but in the case of relatively shallow cavities this conical sleeve may be dispensed with.

In Fig. 7 of the drawings 22 represents a piece of work to which is to be bolted a second piece of work 23 which latter is prepared for attachment to the first piece 22 by having one or more bolt holes 24 formed therethrough from top to bottom. The second piece of work 23 is then placed or clamped in position upon the workpiece 22 after which the spotting device is inserted within the bolt hole 24 as shown, with the prick point 19 resting upon the top of workpiece 22, and with the conical sleeve 11 fitted snugly within the upper end of the bolt hole. The centering bushing 12 is made of a diameter one or two thousandths of an inch smaller in diameter than the bolt hole 24 with the result that the prick point will be held by the bushing approximately at the center of the bolt hole while the conical sleeve 11 will center the upper portion of the spindle 10. After installing the centering device within the bolt hole as described the work piece 23 is spotted at the center of the cavity by means of a hammer blow delivered upon the upper end of the spindle.

In practice of this invention I have provided a set of centering bushings 12 of various diameters, as shown in Fig. 8, each of which is appropriate for use exclusively within a bolt hole of a predetermined standard size. For example, the outside diameters of the bushings of this set, as measured with an inch scale, may be respectively, .528; .513; .450; .418; .388; .365, and .325, of an inch and each is constructed interiorly the same as the bushing 12.

What I claim is:

1. A center punch comprising a straight exteriorly cylindrical spindle made at its one end with an axial interiorly threaded socket; an exteriorly cylindrical centering bushing to fit within a cylindrical cavity having a bottom wall that is to be center-spotted, said bushing being made with a smooth axial cylindrical socket within which said end of said spindle is mounted and with an annular radial abutment shoulder at the inner end of said socket surrounding a centrally disposed aperture, said spindle being of larger diameter than said centrally disposed aperture, and a prick-point element comprising a body provided at its one end with a conical work-engaging point and at its opposite end with an annular radial shoulder surrounding a reduced threaded end extension that extends through the aperture of said bushing and is screwed into the threaded socket of said spindle thereby to cause the radial shoulder of said prick-point element to fixedly clamp said bushing to the end of the spindle.

2. A center punch according to claim 1 and including also a conical sleeve slidably fitted upon said spindle and engageable with the mouth of the cavity to center the outer portion of said spindle.

VINCENT A. DOLASER.

REFERENCES CITED

The following references are of record in the file of this patent:

UNITED STATES PATENTS

| Number | Name | Date |
| --- | --- | --- |
| 1,017,469 | Richter | Feb. 13, 1912 |
| 1,295,785 | Monacelli | Feb. 25, 1919 |
| 1,516,142 | Blood | Nov. 18, 1924 |
| 1,935,678 | Valpey | Nov. 21, 1933 |
| 2,088,359 | Albertson | July 27, 1937 |
| 2,114,228 | Maples | Apr. 12, 1938 |
| 2,248,262 | Wilhide | July 8, 1941 |
| 2,314,775 | Dexter | Mar. 23, 1943 |

FOREIGN PATENTS

| Number | Country | Date |
| --- | --- | --- |
| 109,509 | Switzerland | Mar. 16, 1925 |